(12) United States Patent
Xu et al.

(10) Patent No.: US 7,746,041 B2
(45) Date of Patent: Jun. 29, 2010

(54) NON-ISOLATED BUS CONVERTERS WITH VOLTAGE DIVIDER TOPOLOGY

(75) Inventors: Ming Xu, Blacksburg, VA (US); Julu Sun, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 465 days.

(21) Appl. No.: 11/691,800

(22) Filed: Mar. 27, 2007

(65) Prior Publication Data

US 2007/0296383 A1    Dec. 27, 2007

Related U.S. Application Data

(60) Provisional application No. 60/816,644, filed on Jun. 27, 2006.

(51) Int. Cl.
  G05F 1/613 (2006.01)
  G05F 1/40 (2006.01)
(52) U.S. Cl. .................................. 323/223; 323/282
(58) Field of Classification Search ................ 323/223, 323/224, 225, 282, 283, 284, 285
See application file for complete search history.

(56) References Cited

U.S. PATENT DOCUMENTS

| 6,058,031 | A  | * | 5/2000 | Lyons et al. | 363/67 |
|-----------|-----|---|--------|--------------|--------|
| 6,366,062 | B2 | * | 4/2002 | Baretich et al. | 323/223 |
| 6,696,823 | B2 | * | 2/2004 | Ledenev et al. | 323/272 |
| 7,323,829 | B2 | * | 1/2008 | Moyer et al. | 315/291 |
| 2006/0197491 | A1 | * | 9/2006 | Nojima | 318/801 |

* cited by examiner

Primary Examiner—Adolf Berhane
(74) Attorney, Agent, or Firm—Whitham, Curtis, Christofferson & Cook, P.C.

(57) ABSTRACT

A voltage converter having four switches Q1, Q2, Q3, Q4, connected in series and operated in pairs in a complementary fashion. An input voltage is provided across the four switches. A middle capacitor is connected in parallel with two middle switches Q2, Q3. Voltage output is provided across switches Q3 and Q4 (i.e. at a midpoint of the four switches). Series-connected output capacitors can be connected in parallel with the set of four switches. The middle capacitor alone or in combination with parallel connected capacitors, when connected to the input voltage or output terminals functions as a capacitive voltage divider for voltage conversion and/or regulation with extremely high efficiency and which can provide either step-down or step-up function. Also, an output inductor can be provided as a perfecting feature to further increase efficiency. Alternatively, two of the four switches can be replaced with rectifying diodes. Alternatively, the voltage converter has two or more sets of four switches connected in parallel. The two sets can be connected by resistor-capacitor ladder, or an inductor-capacitor ladder for charge/voltage sharing to reduce voltage ripple.

19 Claims, 8 Drawing Sheets

NON-ISOLATED BUS CONVERTERS WITH VOLTAGE DIVIDER TOPOLOGY

This application claims benefit of priority of the filing date of U.S. Provisional Patent Application 60/816,644, filed Jun. 27, 2006, the entirety of which is hereby incorporated by reference as if fully set forth herein.

BACKGROUND OF THE INVENTION

1. Field of the Invention

The present invention generally relates to voltage converters and regulators and, more particularly, to voltage converters and regulators having several switches or other devices connected in series to form a voltage divider. The circuits in accordance with the present invention are particularly useful for providing low voltages at high currents needed for modern microprocessors. The non-isolated bus converters are suitable for high power density, high efficiency non-isolated unregulated DC/DC conversion but can be operated to provide good voltage regulation, as well.

2. Description of the Prior Art

As microprocessor technology advances, the required microprocessor power supply must provide power with lower voltage, higher current, and higher slew rate. Next generation microprocessors will require operating power at unprecedented low voltages and high current. For example, microprocessors may soon require voltages as low as 0.7 Volts and currents as high as 130 Amps or more with extremely wide and rapid excursions of current load between full operational mode and so-called standby or sleep states. This power must typically be generated from a DC power bus providing 48 volts or 12 volts. Providing reliable, small size, and cost effective power supplies and power conditioning circuits to meet the power requirements of state of the art microprocessors is increasingly difficult. In fact, present state of the art DC-DC converter circuits and voltage regulators will soon be inadequate for use with many foreseeable microprocessor designs.

Present state of the art voltage converters or regulators typically have a single stage or multiple stage buck converter. Two stage buck converters tend to reduce switching losses and reverse recovery losses in the buck converter switches. Also, in a two-stage buck converter, the reduced input voltage to the second stage allows the operating frequency of the second stage to be greatly increased. Consequently, the size of filtering capacitors can be greatly reduced. However, the efficiency gains and size reductions achievable from adding buck stages are inherently limited. Two stage buck converters may not be able to meet the power requirements of microprocessors in a cost effective circuit of acceptably small size.

On the contrary, the rate of change of current that can be delivered to a load, referred to as slew rate, is limited not only by the transient performance of the power supply/voltage regulator (hereinafter sometimes referred to simply as VR or voltage regulator module (VRM)) itself but by interconnect parasitics which can be excessive and further limit transient performance. Therefore, use of filter capacitors of increasing values and size have been used for energy storage to meet needed slew rates even though the limited control bandwidth of VRs is compromised by such increased capacitance.

It has been recognized that the requirement for capacitors to accommodate high slew rate of load current can be reduced by operating switching voltage regulators at higher switching rates or frequencies to provide increased control frequency and transient response. However, such an option has not been widely adopted because the efficiency of known voltage converter topologies is significantly reduced when switching frequencies are increased because the major loss factors are switching losses and body conduction losses associated with the inherent diode in MOSFETs which are used for switching.

SUMMARY OF THE INVENTION

It is therefore an object of the present invention to provide a novel architecture for power supplies and/or voltage regulators in which the use of filter capacitors can be reduced or eliminated and transient response and control bandwidth can be increased.

In order to accomplish these and other objects of the invention, a voltage converter is provided comprising a plurality of selective conduction devices connected to each other in series at respective nodes, at least two of the selective conduction devices being controllable switches, at least one capacitor connected between two of the respective nodes, a voltage source connected to two of the nodes, and a control arrangement for controlling the controllable switches to conduct in a mutually exclusive manner to define two different conduction paths, each including the capacitor such that the capacitor and the plurality of selective conduction devices functions substantially as a capacitive voltage divider or as a voltage multiplier.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
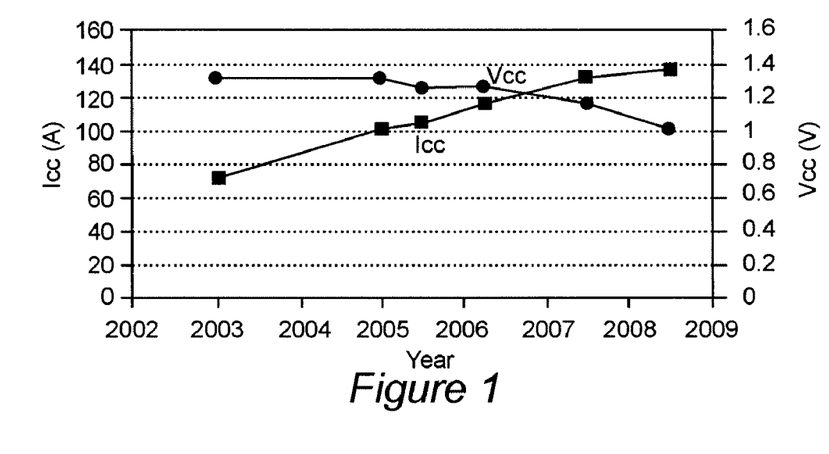
FIG. 1 is a graphical depiction of trends in voltage and current requirements for power supplies as microprocessors have developed.

Referring now to the drawings, and more particularly to FIG. 1, there is shown a graphical depiction of trends in voltage and current requirements for microprocessors as microprocessors have developed, and including projections of voltage and current requirements for foreseeable designs. Basically, since clock cycle times are desirably as short as possible, higher integration density is desirable to reduce signal propagation time which is principally a function of interconnect length and consequent interconnect resistance and capacitance. Reduced interconnect length and capacitance also reduces susceptibility to noise. Therefore, higher integration density is required to minimize interconnect length and capacitance which allows more devices and functions to be provided on a single chip, thus also reducing need for interchip connections in many instances and the number of chips required for a given functionality.

Increased integration density thus limits the voltage which can be withstood between structures on a chip, requiring lower voltage operation (which also reduces power dissipation as clock rates increase) while increased numbers of devices and increased numbers of switching operations at higher clock rates require additional current for operation. It can also be readily appreciated that current requirements can change radically between periods of maximum processing activity and more or less quiescent periods between processing tasks, such as when the processor is waiting for input.

Figure 2A:
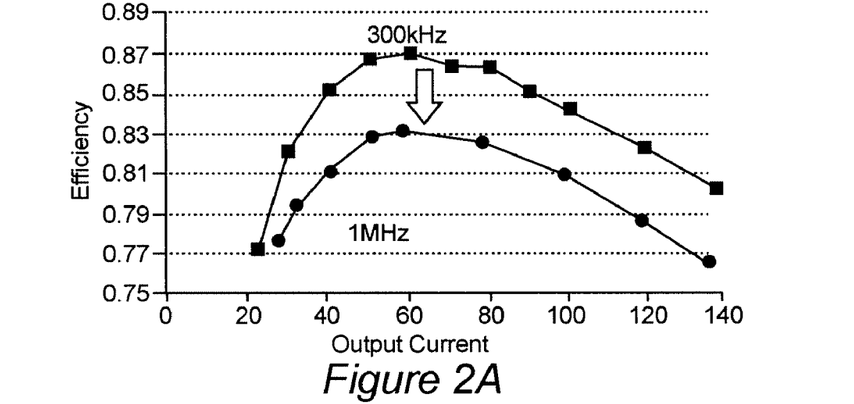
FIGS. 2A and 2B are graphical depictions of efficiency and attribution of losses, respectively in known power supplies of the so-called buck converter type operated at different switching frequencies.
Figure 2B:
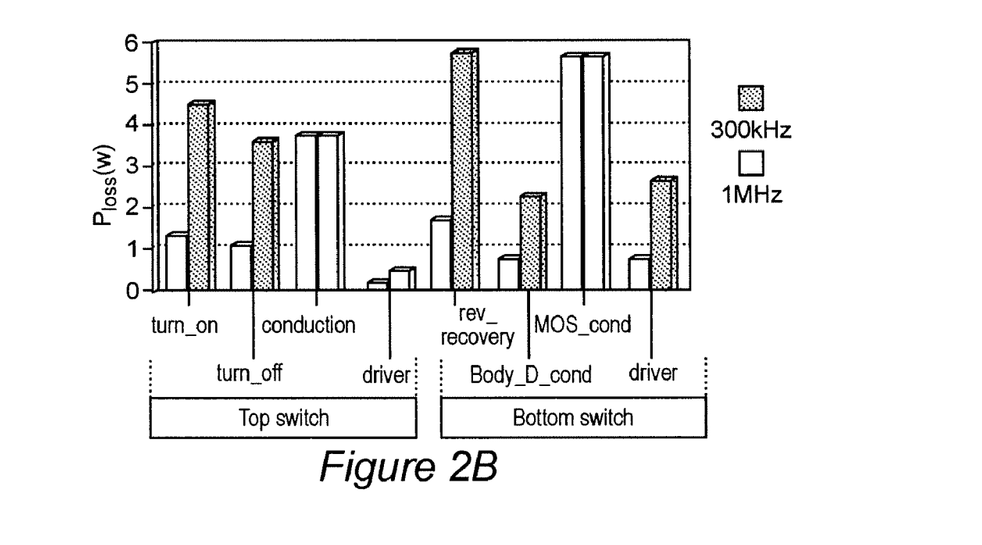

As can be readily understood, when lower voltages are required to avoid breakdown at higher integration densities, operating margins are reduced and become more critical; requiring accurate voltage regulation even when current loads can vary rapidly and over a large range. Therefore, at the present time there are severe trade-offs between size and cost (using large capacitors for filtering and energy storage) and efficiency (using increased switching frequency in switched voltage converters with attendant decrease of efficiency and increase of switching related losses as illustrated in FIGS. 2A and 2B) which can be projected to become even more severe with foreseeable developments in microprocessors and other digital logic circuits.

Figure 3:
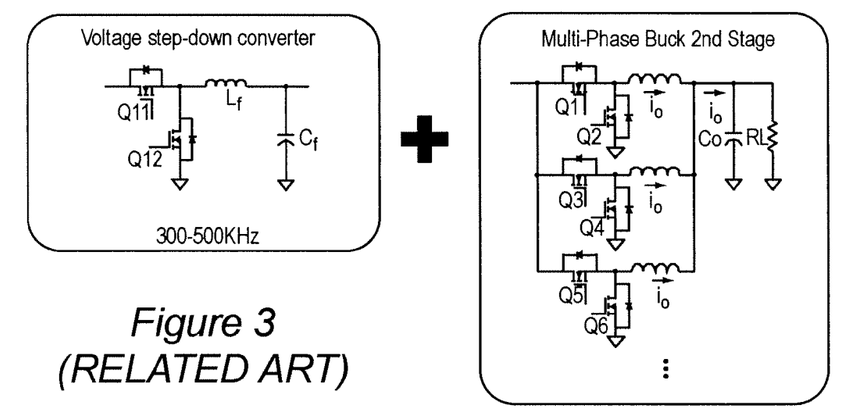
FIG. 3 is a schematic diagram illustrating architecture of a state-of-the-art power converter useful in conveying an understanding of problems addressed by the invention.

In regard to the option of using increased switching frequency, it should be appreciated that state of the art power/voltage converters are generally based on a single stage but possibly multi-phase buck converter used as a voltage regulator (VR); an example of which is shown in FIG. 3 which will be discussed in greater detail below. The VR is typically designed to operate with a switching frequency of about 300 KHz, yielding a control frequency or bandwidth of about 50 KHz (assuming, as a general design guideline that the control frequency fc is about one-sixth of the switching frequency, fs, as is generally accepted in the art). Such operating frequencies clearly require large capacitors for energy storage to accommodate large current slew rates (e.g. changes in load current requirements). However, if fs is increased to 1.2 MHZ (yielding fc=200 KHz) small ceramic capacitors with much smaller footprints than aluminum electrolytic capacitors which may be required to obtain larger capacitance values could be substituted with no cost penalty. At fs=2 MHZ (where fc=350 Khz), bulk filter capacitors could be eliminated altogether in power supplies for current and foreseeable microprocessor designs with about a 30% reduction in cost and much reduced footprint. However, as illustrated in FIGS. 2A and 2B, the loss of efficiency due to switching related losses at higher frequencies has not been acceptable in most instances, even in view of the possibility of reducing VR size and cost.

A different approach to providing a reduction in size of required bulk filter capacitors using a basic buck converter as a voltage converter or voltage regulator in respective stages is illustrated in FIG. 3; no portion of which is admitted to be prior art in regard to the present invention but which is designated as "Related Art" since the present invention is not included therein. The VR arrangement depicted in FIG. 3 is essentially a two-stage VR with the first stage comprising a single-stage buck converter operated at conventionally low frequencies for high efficiency (e.g. as in the upper graph of FIG. 2A) used principally for voltage conversion but not regulation and a second stage comprising multiple phases of similar buck converters operating at high frequency for voltage regulation with a relatively low voltage differential from input to output.

As is well-understood by those skilled in the art, a buck converter is characterized by having a so-called top switch (e.g. Q11) in series with an inductor and controlling the application of input voltage thereto. When Q11 is on/conductive, the current in the inductor increases and the increasing voltage thus developed across the inductor in response to the increasing current "bucks" the input voltage and reduces the voltage at the output. When the top switch is off, a so-called bottom or freewheeling switch (e.g. Q12) is turned on to supply current to the inductor as the diminishing current in the conductor develops a voltage which continues to deliver current to the filter capacitor and/or load. As can be seen from FIG. 2B, the largest losses in the buck converter are associated with the bottom switch and greatly increase with increase of switching frequency, fs.

The second stage of the VR arrangement shown in FIG. 3, by operating at a low input-to-output voltage differential can drastically reduce switching losses and body diode losses which are proportional to input voltage and thus achieve an efficiency of about 83% even at fs=2 MHZ but which still dominates the contribution to VR losses of the arrangement and further reduce overall efficiency; the overall VR efficiency being the product of the efficiencies of the respective stages. However, the large size of the first stage due to low fs operation to maintain high efficiency and the need for at least coarse regulation therein to maintain efficiency of the second stage largely negates the reduction of size achieved in the second stage.

The efficiency of the first stage is also limited to about 87% even when operated at a relatively low fs=300 KHz. Detailed analysis of such a two-stage approach confirms the limitations on the size reduction that can be achieved consistent with acceptable, although marginal, efficiency and accommodation of current microprocessor power requirements; thus limiting use of such an approach in applications where there is sensitivity to power density requirements. It should also be appreciated in this regard that the required size of the inductors in single or multiple phase buck converters and other switched voltage converter topologies also constitute a limitation on the size reduction which can be achieved.

To solve this problem and provide additional size reduction while allowing high fs and achievement of high efficiency (e.g. above the efficiency which can be achieved with a buck converter), the invention provides a DC/DC converter with no requirement for any magnetic component (e.g. a transformer or inductor) although, as will be discussed below, a small inductor can advantageously be employed as a perfecting feature of the invention although such an inductor is not necessary to the successful practice of the invention in accordance with its basic principles. Since no magnetic element is required and capacitors can be reduced in size through operation at higher fs without significant compromise of efficiency, the power density of the first stage can be greatly increased. Furthermore, by leaving voltage regulation to a second stage, the first stage DC/DC converter in accordance with the invention and having a 2:1 conversion ratio can achieve an efficiency of 98% or more with a 12V or higher input. A power density of 1 KW/in$^3$ and 99% efficiency at light load has been demonstrated in a prototype device employing the principles of the invention.

Figure 4A:
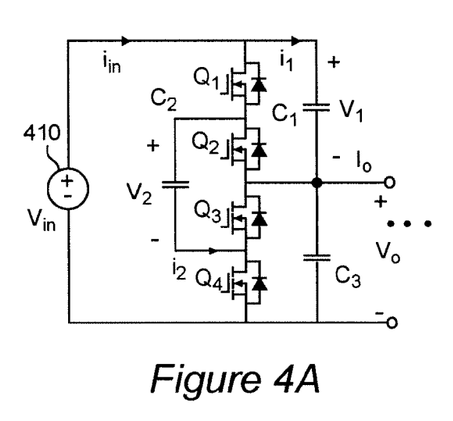
FIG. 4A is a schematic diagram of a power converter stage in accordance with the invention which is of a configuration particularly useful for conveying an understanding of the basic principles of the invention.
Figure 4B:
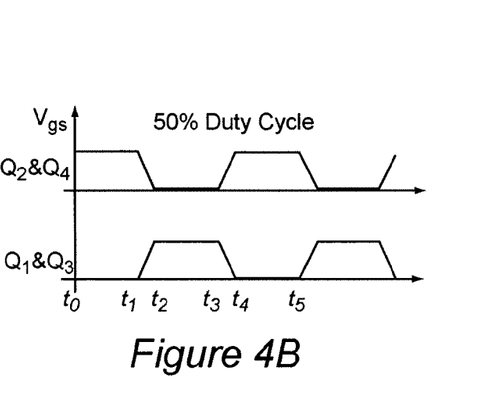
FIG. 4B is a graphical depiction of waveforms suitable for operation of the power converter of FIG. 4A in accordance with its basic principles.

An exemplary circuit embodying the invention and particularly useful for conveying an understanding of the basic principles of the present invention is illustrated in FIG. 4A with exemplary switching waveforms shown in FIG. 4B. The circuit of FIG. 4A includes an input power source 410 at a voltage $V_{in}$ with a circuit comprising preferably four selective conduction devices such as transistors Q1-Q4 connected in series at respective nodes across the input power supply 410. Additionally, capacitor C1 is connected in parallel with transistors Q1 and Q2, capacitor C2 is connected in parallel with transistors Q2 and Q3 and capacitor C3 is connected in parallel with transistors Q3 and Q4 and in series with capacitor C1 across the voltage source. The output is taken from the junction node connection of transistors Q2 and Q3 which is also the common node connection of the series connection of capacitors C1 and C3 which will be recognized to be a capacitive voltage divider.

As shown in the waveforms of FIG. 4B, the four transistors Q1-Q4 are operated in pairs and out of phase such that Q1 and Q3 are in an on state while Q2 and Q4 are in an off state and vice-versa. That is, Q1 and Q3 conduct a mutually exclusively to Q2 and Q4 in a preferably near-complementary manner with only a slight "dead-time" between conducting states to prevent shorting across the power supply. Switching in such a fashion develops two separate conduction paths across the power supply, each of which includes a series connection of C2, placing capacitor C2 alternately in parallel with capacitor C1 (when Q1 and Q3 are on and Q2 and Q4 are off) and C3 (when Q1 and Q3 are off and Q2 and Q4 are on).

The basic effect of such switching is that when the output voltage on C3 in the capacitive voltage divider formed by C1 and C3 is pulled down (e.g. by $\Delta V$) by a load and C2 is in parallel with C1, C2 (and C1) will be charged to a voltage ($V1=V2=V_{in}/2+\Delta V$) greater than $V_{in}/2$ by an amount ($\Delta V$) equal to the reduction of Vo below $V_{in}/2$ of the voltage on capacitor C3 due to the load. Then, when C2 is switched to be in parallel with C3, the charge corresponding to the increased voltage ($V2>V_{in}/2-\Delta V$) is distributed between C2 and C3 and increases the voltage thereon to slightly above $V_{in}/2$ while also being available to the load. Thus the switching described above and illustrated in FIG. 4B effectively stabilizes Vo at $V_{in}/2$ with a small ripple over a wide range of load currents. Since losses in capacitors due to currents therein are generally extremely small and losses are substantially confined to conduction losses in the switching transistors Q1-Q4, efficiency can be very high as noted above and only varies significantly with frequency (which also determines ripple magnitude for a given load) when on/off time of the transistors Q1-Q4 (e.g. to-t1, t2-t3, etc. in FIG. 4B) becomes comparably short relative to the switching transient time (e.g. t1-t2, t3-t4, etc. in FIG. 4B).

A duty cycle of about 50% is preferred, as shown in FIG. 4B, but some minimization of ripple or even adequate regulation may be achieved by variation of duty cycle, depending on characteristics of particular circuit elements, particular load currents and the like as will be apparent to those skilled in the art in view of the above discussion and recognizing that capacitor C2 can generally be charged very quickly when in parallel with C1 but will increase (e.g. double) the charge/current which can be delivered for a given voltage reduction on capacitor C3 when C2 is in parallel with C3.

Figure 5:
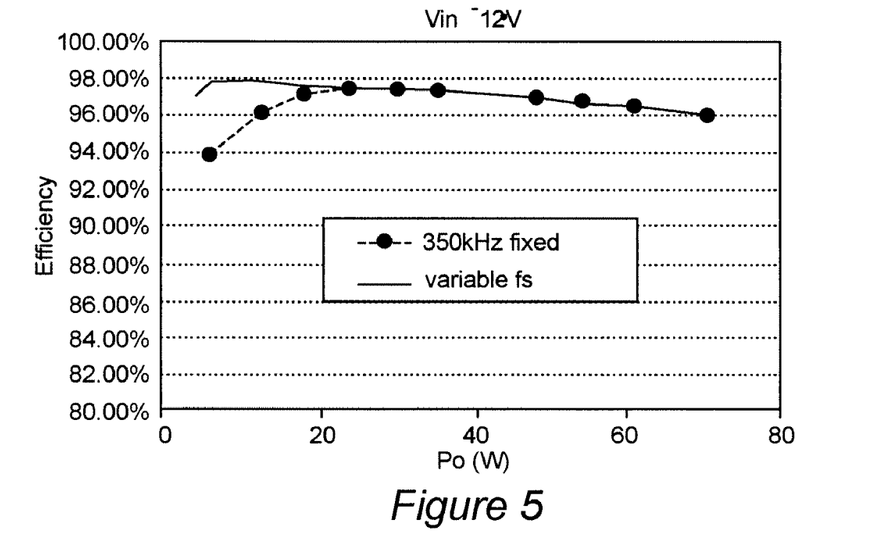
FIG. 5 is a graphical depiction of experimental results indicating efficiency of the power converter of FIG. 4A under different switching frequency conditions.

Since losses in capacitors are very small and losses in transistors can be held to very low levels by appropriate transistor selection and/or design, as will be evident to those skilled in the art, the efficiency of the voltage converter in accordance with the invention can be very much greater than that of a buck converter while the capacitor size can be reduced by use of a suitably high switching frequency in accordance with an acceptable ripple voltage. FIG. 5 graphically illustrates the efficiency of the circuit of FIG. 4A at fs=350 KHz and for a switching frequency which is variable and can be optimized for a given load. For example, for light load (where the ripple would be relatively small) efficiency can be substantially increased by reducing the switching frequency. Since there is no inductor in the circuit, there is no penalty for such frequency reduction at light load. It should also be noted from FIG. 5 that the efficiency remains above 96% to a load power of 80 Watts and that switching frequency does not affect efficiency other than at very light loads. That is, an optimized fs provides essentially the same efficiency as a fixed fs=350 KHz above a load of about 20 Watts.

Such a circuit can also be cascaded (e.g. by applying a similar circuit in one or more subsequent stages) to provide a greater voltage conversion ratio with a factor of two voltage reduction for each such stage; the efficiency of each stage being comparable to that described above. For example, a two stage prototype (e.g. with the input taken from the output of the stage described above, and so on, as indicated by dots at the output of the circuit of FIG. 4A) providing a 4:1 voltage conversion ratio ($V_{in}$=48V, Vo=12V) developed a 96% efficiency while maintaining a 1 KW/in$^3$ power density. Other voltage conversion factors can be achieved by adjustment of capacitor values, pulse width modulation (PWM) of the switching control waveforms and/or increasing the number of series connected capacitors and series connected selective conduction devices.

It should also be recognized that capacitor C1 can be omitted from the circuit of FIG. 4A with essentially no change in the basic operation thereof while substantially reducing capacitor volume. That is, when Q1 and Q3 are on (and Q2 and Q4 are off), a capacitive voltage divider is formed by a series connection C2 and C3 with C2 charging to $V_{in}/2+\Delta V$ as discussed above. Then, when Q2 and Q4 are on (and Q1 and Q3 are off) C2 and C3 will be connected in parallel and the charge corresponding to $\Delta V$ on C2 will be distributed between them and made available to the load, as before. It can also be appreciated, particularly from such a modification of the circuit of FIG. 4A, that the value of C2 may be somewhat more critical and more difficult to reduce without compromising performance than the value of C3. Depending on anticipated load conditions, nominal fs and performance parameters of the switches, it may be preferable to provide C2 having a significantly larger value than C3 and to adjust the duty cycle such that the parallel connection of C2 and C3 is longer than a serial connection thereof in order to maximize efficiency and minimize ripple voltage. Due to the symmetry of the circuit of FIG. 4A, the same analysis and mode of operation could, in theory, be applied to capacitor C3 rather than C1 and a similarly variant form of the embodiment of FIG. 4A could omit capacitor C3 while retaining capacitor C1. That is, when Q2 and Q4 are on and Q1 and Q3 are off, C1 and C2 are connected as a capacitive voltage divider to charge both C1 and C2 to $V_{in}/2$ and when Q1 and Q3 are on and Q2 and Q4 are off, both C1 and C2 are connected in series between the input voltage and the output and thus reduce the output voltage to $V_{in}-V_{in}/2=V_{in}/2$. It should also be noted that both C1 and C3 could be omitted and switching of Q1-Q4 as described above would cause C2, alone, to function as a capacitive voltage divider through rapid switching of the connection relative to the (e.g., central) node of the selective conduction devices where the voltage converter output is taken.

Figure 6A:
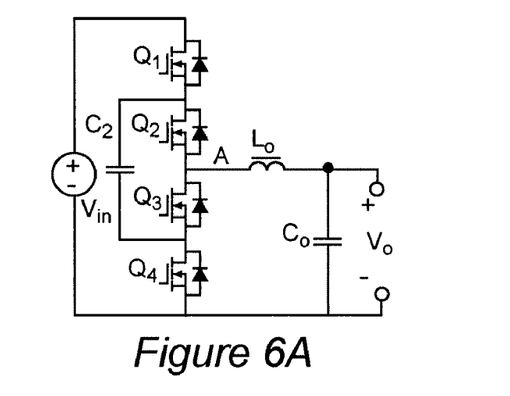
FIG. 6A is a schematic diagram of a variant embodiment of the circuit of FIG. 4 illustrating the omission of a capacitor therefrom and the inclusion of a perfecting feature of a small inductance to enhance efficiency and reduce capacitance values and size.
Figure 6B:
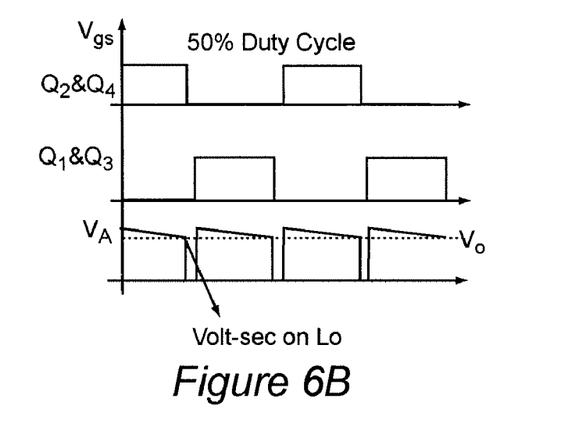
FIG. 6B illustrates exemplary waveforms suitable for operation of the embodiment of FIG. 6A and to explain choice of value of the small inductance.

For further efficiency improvement and in order to reduce the required capacitance of capacitor C2, a very small inductor Lo may be introduced as a perfecting feature of the invention but which is not necessary to the operation of the voltage divider/converter in accordance with its basic principles, discussed above. Such a circuit is illustrated in FIG. 6A and corresponding switching and output voltage waveforms are shown in FIG. 6B. The circuit of FIG. 6A also omits capacitor C1 of FIG. 4A (which should be understood to also be representative of the omission of C3 instead of C1) as discussed above. In this case, the capacitor C3 may be configured as a filter capacitor Co in combination with small inductor Lo functioning much as an LC filter in a buck converter. However, as can be seen from FIG. 6B, the filter is only required to cover the very short "dead-time" between the conduction or off times of the pairs (Q1, Q3 and Q2, Q4) of switching transistors Q1-Q4 which is slightly longer than the switching transition times of the transistors, typically less than 100 nsec. and the inductance can thus be very small, typically about 25 nH. Such a small inductance and short dead time is entirely consistent with operation of the circuit as a capacitive voltage divider, as described above since the voltage across the small inductor will necessarily be less than the ripple voltage at any given load. Further, by taking advantage of resonance between C2 and the inductor during the switching half-cycle, all switches can be turned off in a zero current switching (ZCS) condition; reducing stress on the transistors and reducing noise.

Figure 7A:
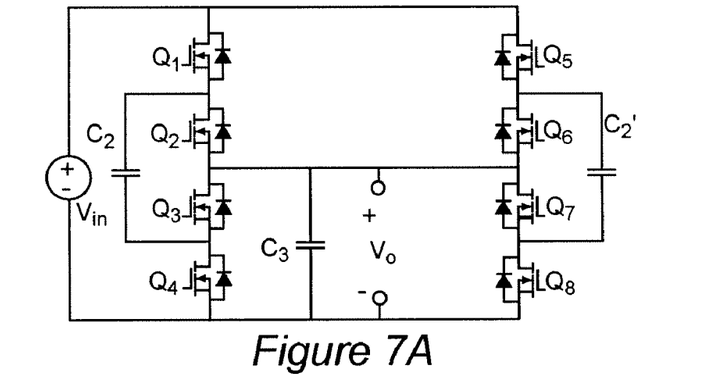
FIGS. 7A and 7B illustrate an embodiment of the invention including a plurality of the circuits of FIGS. 4A and 6A, respectively, and operated in an interleaved manner, FIGS. 8A and 8B generally correspond to FIGS. 7A and 7B but further include an additional perfecting feature for providing charge/voltage sharing between interleaved legs of the power/voltage converter to further reduce ripple.
Figure 7B:
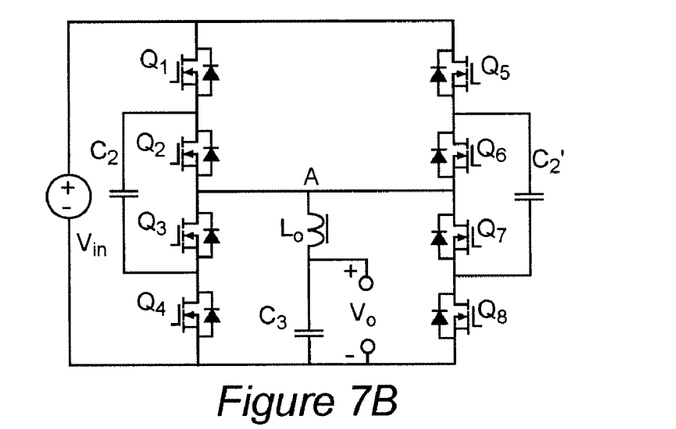

To further reduce current ripple and/or allow further capacitor value and size reduction at a given output voltage ripple, it is possible, as another perfecting feature of the invention which is not necessary to its operation in accordance with its basic principles, to provide interleaved operation of multiples of the circuit of FIG. 4A connected in parallel in the manner illustrated in FIGS. 7A and 7B; generally corresponding to the circuit of FIG. 6A (e.g. corresponding to FIG. 4A but omitting one of capacitors C1 and C3) with and without the small inductor Lo, respectively. Each leg of these circuits is driven in accordance with the waveforms of FIG. 4B but with a phase shift of 180° between the respective legs. While other phase relationships between the respective legs are possible, a 180° phase difference keeps one of capacitors C2 and C2' in parallel with capacitor C3 in FIG. 7A or Co in FIG. 7B at all times. Additional legs can be added in the same manner; in which case the preferred phase shift between each of n legs would be 360°/n and the effective output capacitance at any time would be (C3+(n−1)C2).

As a further perfecting feature of the invention which is not necessary to operation in accordance with the basic principles of the present invention, it is also possible to guarantee voltage sharing between capacitors C2 and C2' of FIG. 7A or 7B. Doing so also tends to reduce ripple and further, since one capacitor is connected as a voltage divider and the other in parallel with capacitor C3 or Co at any given time, capacitors C2 and C2' are charged to voltages with substantially complementary ripple voltages which tends to cancel output ripple voltage and, moreover, any charge sharing between these capacitors where one is connected in parallel with C3 or Co, effectively increases the stored power available which can potentially be available to the load to accommodate high current transients and provide high slew rate, allow capacitor size to be reduced or a combination thereof.

Figure 8A:
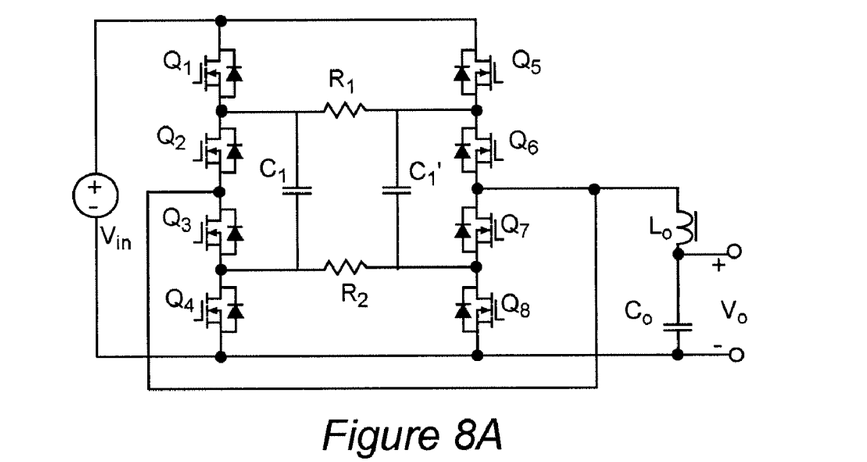
Figure 8B:
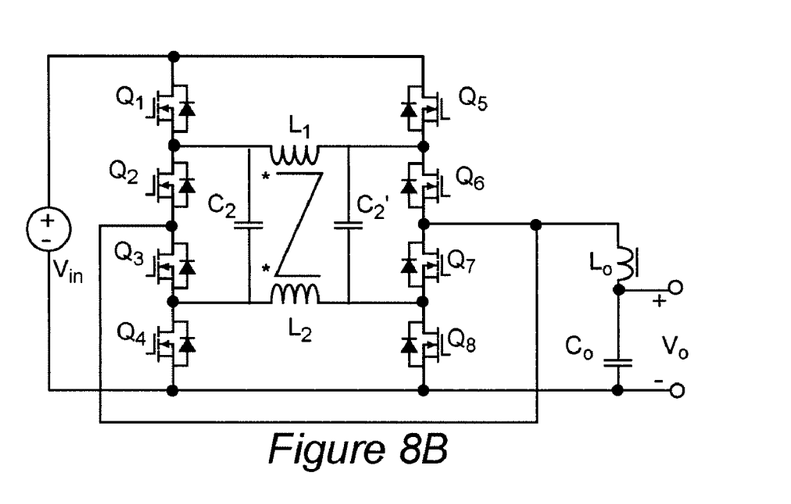

Such charge or voltage sharing can be achieved easily, at low cost and with little, if any, compromise of current density by connecting two large valued but low dissipation (e.g. small physical size) resistors between respective terminals of C2 and C2' as shown in FIG. 8A. Alternatively, the same charge/voltage sharing beneficial effects can be achieved by coupled inductors L1, L2, as illustrated in FIG. 8B. Because the winding currents are very small, the coupled inductors may also be physically very small. Additionally, by exploiting resonant current therein, zero voltage switching (ZVS) can be achieved. If additional legs are added in the manner described above, the charge/voltage sharing circuit can be configured in a "Y" or "Δ" configuration having a similar total number of legs. Incidentally, while the circuit diagrams of FIGS. 8A and 8B have been redrawn for clarity in depicting the charge/voltage sharing perfecting feature of the invention, the topologies illustrated therein are otherwise identical to those of FIGS. 6A, 7A and/or 7B.

It should be appreciated that all of the embodiments of the invention discussed above in connection with exemplary circuits thereof are bi-directional in regard to current flow. Therefore, while the circuits discussed above have been arranged for step down of voltage between input and output, the input and output can be interchanged to provide a voltage step-up or voltage multiplication function, as can be appreciated from a comparison of FIGS. 9A (for step-down) and 9B (for step-up). It is to be noted that when Q4 is on and capacitors C2 and C3 are connected in parallel, both will be charged to the input voltage, $V_{in}$. Then, when Q3 is on (and Q4 is off) and C2 is connected in parallel with capacitor C1, C1 will, over several cycles, be charged to $V_{in}$, while also being referenced to $V_{in}$, thus providing voltage doubling. Such circuits can also be cascaded to provide larger voltage conversion factors as indicated by dots at the outputs as also shown in FIG. 4A, as discussed above. As discussed above, capacitor C1 and/or C3 can be omitted from either of these embodiments and/or the perfecting feature of a small inductor and configuration of capacitor C3 as a filter capacitor as shown and discussed above in and in connection with FIG. 6A can be included as may be desired and should be considered as being so illustrated in the drawings. It should also be appreciated that the variant embodiments of the invention discussed above in connection with FIGS. 6A 7A, 7B, 8A and 8B can also be made to operate as step-up converters or voltage multipliers simply by interchanging $V_{in}$ and Vo (including any filtering and/or voltage sharing arrangement).

Figure 9A:
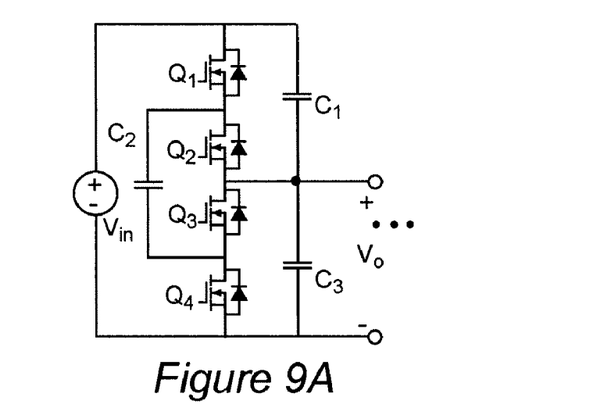
FIGS. 9A and 9B are schematic diagrams of embodiments of the invention showing the use of a voltage/power converter in accordance with the invention to produce a step-down or step-up function, respectively.
Figure 9B:
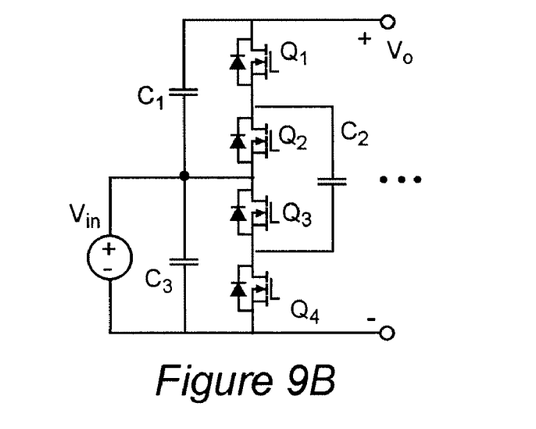
Figure 10:
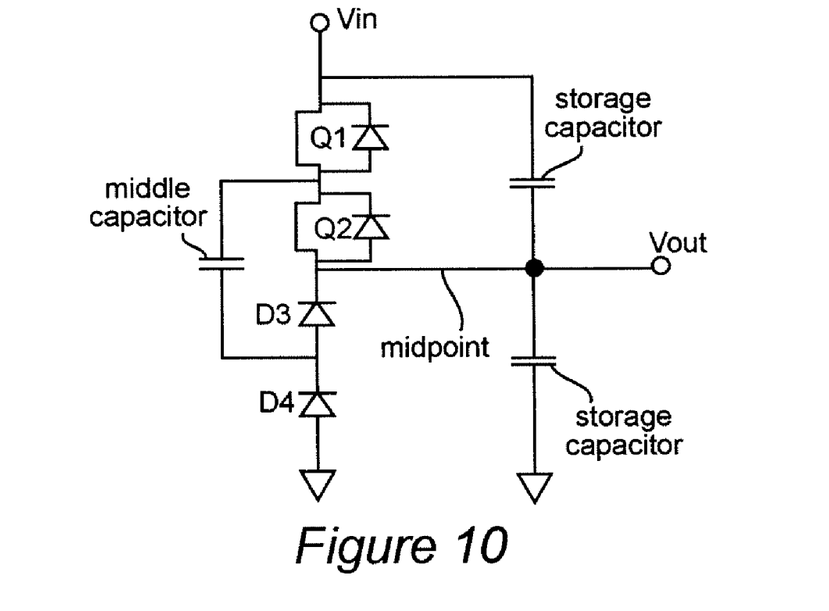
FIGS. 10 and 11 are schematic diagrams illustrating substitution of diodes for switches Q1-Q4 with reference to the embodiment of FIG. 4A.
Figure 11:
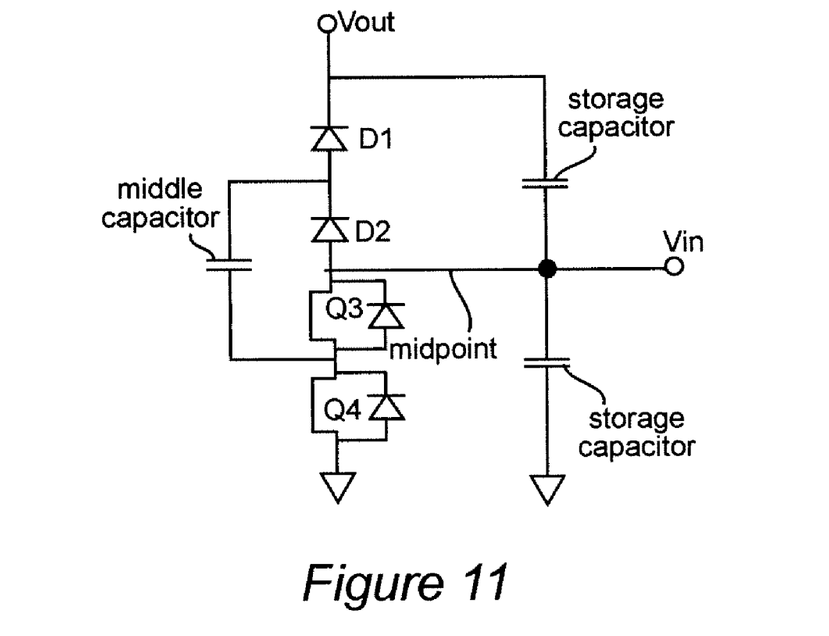
Figure 12:
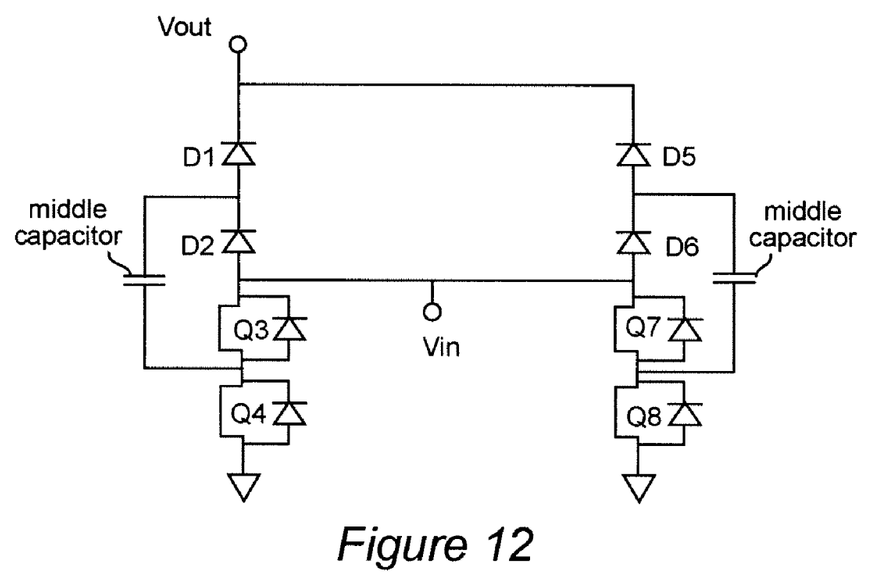
FIG. 12 is a schematic diagram illustrating similar substitution of diodes for switches in embodiments having plural legs operated in an interleaved fashion in the manner illustrated in FIGS. 7A and 7B, and FIGS. 13 and 14 are schematic diagrams showing similar substitution of diodes in the embodiments of FIGS. 9A and 9B respectively.
Figure 13:
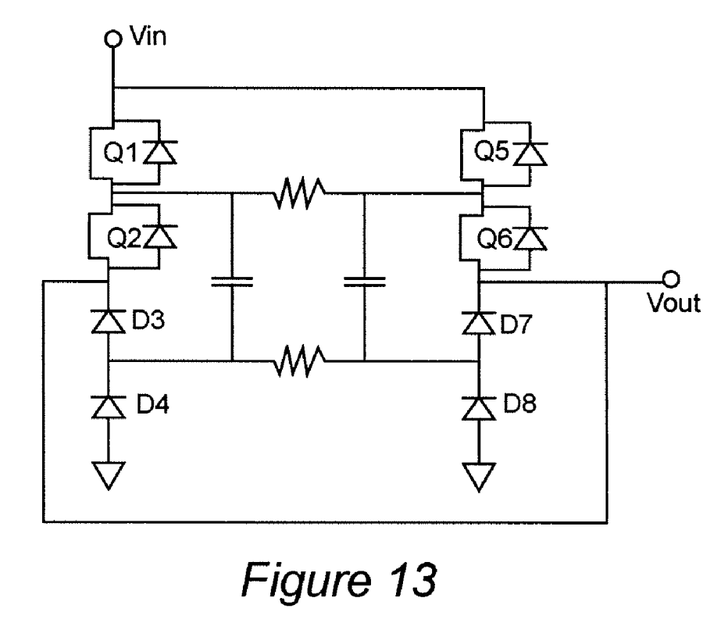
Figure 14:
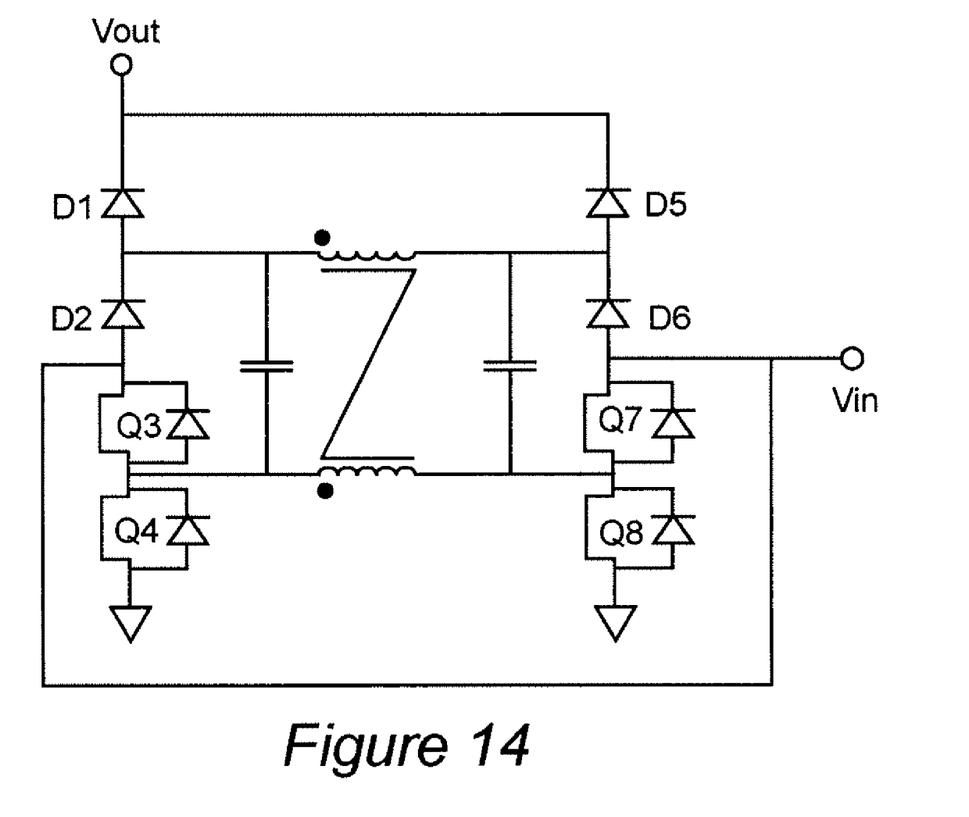

Further, as variants of the invention within the intended scope thereof, in all of the step-down embodiments of the present invention discussed above or in step-up embodiments in accordance with FIG. 9B, it is only necessary that a single transistor of each pair of selective conduction devices or each switching phase as illustrated in FIG. 4B be an active, controllable switch while the other could be replaced by diodes with consequent space saving and circuit simplification as illustrated in FIGS. 10 and 11. That is, in the circuit of FIG. 4A, discussed above, transistors Q3 and Q4 could be replaced by diodes D3, D4 as shown in FIG. 10 or, alternatively, in a step-up counterpart such as that of FIG. 9B, transistors Q1 and Q2 could be replaced by diodes as shown in FIG. 11. More generally, only one active and controllable switch is required in each switching phase across the input voltage of the circuit of FIG. 4A and thus, in general, diodes can be substituted for at least 50% of the switches Q1-Q4 in the embodiment of FIG. 4A and variants thereof. Similar diode substitutions can be made in embodiments having plural legs operated in an interleaved fashion as illustrated in FIGS. 7A and 7B, whether or not the perfecting feature of charge/voltage sharing arrangements are provided. An exemplary such substitution in FIG. 7A is shown in FIG. 12. Diode substitution can also be made in embodiments of the invention including voltage sharing arrangements as illustrated in FIGS. 13 and 14.

It should also be noted that when multiple legs which are operated in an interleaved fashion as described above, C2 or C2' will be connected in parallel with C3 or Co in FIG. 7A or 7B, respectively, and thus C3 becomes redundant and can be omitted, as also shown in FIG. 12. The same theoretically applies to Co for the same reasons and Co can also be omitted if sufficient capacitance is presented elsewhere in the circuit to operate as a filter or resonator for Lo.

It should also be appreciated that while the above embodiments of the invention have been discussed in connection with a 50% duty cycle (for simplicity of explanation and to facilitate an understanding of the invention) and assuming that voltage regulation would be performed in an additional stage as in FIG. 3 with efficiency of such a second stage (of essentially arbitrary constitution) being maximized through voltage reduction using a circuit in accordance with the present invention as a first stage, by using feedback and pulse width modulation control in a manner well-understood in the art, any of the above embodiments of the invention and variants thereof can also provide good regulation at high efficiency with trade-offs between efficiency, size and the range over which voltage is to be regulated even in a single stage power converter since a larger inductor (connected as shown in FIG. 6A) would be required to accommodate greater volt-second "dead-time". However, it should be understood that a voltage divider circuit in accordance with the present invention could be used for both a first stage voltage converter (which may include several stages/sub-stages to achieve a desired conversion ratio) and a second stage voltage regulator with the combination providing higher efficiency than has been attainable to date using other topologies for either or both stages.

In view of the foregoing, it is seen that the present invention provides a novel voltage converter topology in the form of a capacitive voltage divider capable of operating at very high efficiency whether used for voltage conversion over a large voltage range or to provide voltage regulation with high accuracy. The present invention allows very high power density to be achieved by eliminating any need for a magnetic element (or allowing very small magnetic elements to be used as a perfecting feature of the invention) and greatly reducing the amount of capacitance necessary to accommodate high current slew rate requirements and which is operable at relatively high switching (and control) frequencies minimal compromise of efficiency; none of which have been achieved through prior voltage/power converter topologies to the degree provided by the invention.

To recapitulate, future generation microprocessors and other digital or hybrid circuits are expected to operate at much lower voltages (0.7-1V), to draw much higher currents (130A as shown in FIG. 1) with high di/dt dynamic characteristics (20 A/ns). Accordingly, voltage regulator (VR) will have to meet increasing challenges such as higher conversion efficiency, tighter voltage tolerances, and faster transient responses. Current power management solution can no longer satisfy the future requirements. The excessive interconnect parasitics between the VR and the CPU limits the transient performance and efficiency. Furthermore, the limited control bandwidth of the VR is compromised with increasing usage of output capacitors for energy storage. Without fundamental change of today's power delivery architecture, it is expected that the output capacitors will increase drastically; a circumstance which it is an object of the invention to avoid through provision of a novel voltage/power converter architecture.

To reduce the excessive usage of capacitors, the bandwidth of the VR must be increased. Assuming $fc=\frac{1}{6}*fs$, when the switching frequency of VR is increased to 1.2 MHz, the bulk capacitors could be switched from aluminum electrolytic capacitor to ceramic without added cost, yet with much smaller footprint. At 2 MHz switching frequency (350 kHz bandwidth), the bulk capacitors can be completely eliminated, which means a 30% of cost reduction of VR and smaller foot-print on the real estate of motherboard.

The present invention provides a voltage converter that operates as a capacitive voltage divider. The present voltage converter has four switches, Q1, Q2, Q3, Q4, (e.g. MOSFET or IGBT switches) connected in series and operated preferably in a complementary manner. A middle capacitor is connected in parallel with a middle pair, Q2, Q3, of the four switches. Also, two storage capacitors are connected in series, and in parallel with the four switches. Theoretically, either one or both of the storage capacitors can be omitted.

An embodiment of the present invention may include a voltage converter having two sets of four switches, Q1, Q2, Q3, Q4, and Q5, Q6, Q7, Q8, connected in parallel and operating in an interleaved fashion. Each set can have a capacitor connected in parallel with a middle pair Q2 Q3 and Q6 Q7 of each set of four switches. Alternatively, a resistor-capacitor ladder can be connected across the sets. Also alternatively, an inductor-capacitor ladder can be connected across the sets.

In alternative embodiments, 50% of the switches can be replaced with rectifier diodes, further reducing costs and size. Also, the present voltage converters can be operated as step-up or step-down converters. The present voltage converters are also bi-directional in power flow.

The voltage converters in accordance with the present invention provide exceptionally high power conversion efficiency and voltage conversion ratio. Also, the present voltage converters can be very small and require very little circuit board space. It will be clear to one skilled in the art that the above embodiment may be altered in many ways without departing from the scope of the invention. Accordingly, the scope of the invention should be determined by the following claims and their legal equivalents.

To solve this issue, a magnetic-less DC/DC converter is developed. Because no magnetic component is required, it can substantially boost the power density of the first stage. Furthermore, by leaving the voltage regulation to the second stage, proposed DC/DC converter for the first stage with fixed 2:1 conversion ratio can achieve as high as 98% efficiency with 12V or even higher input voltage in whole load range. FIG. 6 shows the prototype and measure efficiency. 1 KW/in³ power density and 99% efficiency at light load have been demonstrated.

By cascading this circuit, higher conversion ratio can be obtained, such as 4:1. Hardware has been also built for a 48V input case with 12V output. 96% efficiency and 1 Kw/inch³ have been realized. For further efficiency improvement and capacitance reduction of C2, a tiny inductor can be introduced (see FIG. 6A). Due to ultra-small Volt-Sec on the inductor during the dead time, normally less than 100 ns, the inductance can be very small, such as 25 nH. Moreover, by taking advantage of the resonance between C2 and this inductor during the half switching cycle, all switches can be turn-off in ZCS condition.

To reduce the input current ripple and further reduce the capacitance required, two or more parallel-connected voltage converters operating in an interleaved fashion can be provided as shown in FIGS. 7A and 7B. Two legs have 180° phase shift. Each leg follows the driving scheme in FIG. 4B. To guarantee the voltage sharing between C1 and C2 in FIGS. 7A and 7B, two large value resistors with tiny power dissipation are proposed as shown in FIG. 9(a). Other than resistors, coupled inductors or transformers can be adopted, as shown in FIG. 8B. Coupling between two inductors as shown in FIGS. 8B, 18 and 20 is optional. Because the winding current is very small, this magnetic component can be very small. Also, with the help of the magnetizing current, Zero Voltage Switching (ZVS) can be realized.

All of the circuits discussed above are bidirectional in power flowing and can be used for voltage step up purpose as well as step down purposes. In the voltage step-down versions, as shown in FIGS. 4A-8B, the bottom switches Q3 and Q4, and Q7 and Q8 as well, can be replace by diodes. In the voltage step-up versions, where the input and output in FIG. 4A-8B should be reversed, the top switches, Q1 and Q2, and Q5 and Q6 as well, can be replaced by diodes.

Lastly, through PWM control on the gate driving signal, all circuits above are able to regulate the output voltage. Depending on the application of the present invention, trade-off can be made between the efficiency, power density and voltage regulation range.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A voltage converter comprising
    a plurality of selective conduction devices connected to each other in series at respective nodes to form a series connection, at least two of said plurality of selective conduction devices being controllable switches,
    at least one capacitor connected between two of said respective nodes connecting said plurality of selective conduction devices to each other,
    a voltage source connected to two of said respective nodes at respective ends of said series connection, and
    means for controlling said controllable switches to conduct in mutually exclusive groups to define two different conduction paths, each of said two different conduction paths including a conduction path through said at least one capacitor, whereby said combination of said at least one capacitor and said plurality of said selective conduction devices functions substantially as a capacitive voltage divider to reduce a voltage provided by said voltage source or as a voltage multiplier to increase a voltage supplied by said voltage source.

2. The voltage converter as recited in claim 1, further comprising
    at least one additional capacitor connected to an output connection of said voltage converter, said at least one capacitor being connected in series with said at least one additional capacitor in one of said two different conduction paths and in parallel with said at least one additional capacitor in another of said two different conduction paths.

3. The voltage converter as recited in claim 1 wherein said means for controlling said controllable switches operates said controllable switches with a 50% duty cycle.

4. The voltage converter as recited in claim 1, further comprising
    an inductor connected in series with an output connection of said voltage converter.

5. The voltage converter as recited in claim 4, further comprising
    a filter capacitor connected in parallel with an output of said voltage converter.

6. The voltage converter as recited in claim 1, further comprising
    a filter capacitor connected in parallel with an output of said voltage converter.

7. The voltage converter as recited in claim 1, wherein said plurality of selective conduction devices comprise four selective conduction devices.

8. The voltage converter as recited in claim 1, wherein said plurality of selective conduction devices include diodes.

9. The voltage converter as recited in claim 1, further comprising
    a further plurality of selective conduction devices connected to each other in series at respective nodes and in parallel with said plurality of selective conduction devices, at least two of said further plurality of selective conduction devices being controllable switches,
    at least one further capacitor connected between two of said respective nodes of said further plurality of selective conduction devices,
    a voltage source connected to two of said respective nodes, and
    means for controlling said controllable switches of said further plurality of selective conduction devices to conduct in a mutually exclusive manner and complementary to said controllable switches of said plurality of selective conduction devices to define two further different conduction paths, each of said two different conduction paths including a conduction path through said at least one further capacitor.

10. The voltage converter as recited in claim 9, further comprising voltage sharing means connected between said at least one capacitor and said at least one further capacitor.

11. The voltage converter as recited in claim 10, wherein said voltage sharing means includes resistors.

12. The voltage converter as recited in claim 10, wherein said voltage sharing means includes coupled inductors.

13. The voltage converter as recited in claim 9, wherein said plurality of selective conduction devices include diodes.

14. A voltage converter, comprising:
    a) a set of four switches Q1, Q2, Q3, Q4, connected in series, and connected, in order, across a voltage input;
    b) a capacitor connected in parallel with a middle pair Q2, Q3, of the four switches;
    c) a pair of storage capacitors connected in series with each other, and connected in parallel with the set of four switches, and wherein a midpoint of the storage capacitor pair is connected to a switch midpoint node connecting switches Q2 and Q3; and d) a gate driver for operating switches Q1, Q3, in a manner complementary to switches Q2 Q4;

whereby an output voltage is provided across switches Q3 and Q4.

15. The voltage converter of claim 14, further comprising an output inductor connected to a switch midpoint, and connected to a voltage output.

16. A voltage converter, comprising:
a) a first set of four switches Q1, Q2, Q3, Q4, connected in series;
b) a middle capacitor connected in parallel with a middle pair Q2, Q3, of the first set of four switches;
c) a second set of four switches Q5, Q6, Q7, Q8, connected in series, wherein the first set and second set are connected in parallel, and connected across a voltage input or output;
d) a second capacitor connected in parallel with a middle pair Q6, Q7, of the second set of four switches;
e) a gate driver for operating switches Q1, Q3, in a complementary manner compared to switches Q2, Q4, and for operating switches Q5, Q7, in a complementary manner compared to switches Q6, Q8;

wherein an output voltage, or input voltage, is provided across switches Q3 and Q4, and across switches Q7 and Q8.

17. The voltage converter of claim 16 further comprising an output inductor connected to the voltage output.

18. The voltage converter as recited in claim 16 wherein said voltage converter is a step down voltage converter.

19. The voltage converter as recited in claim 16 wherein said voltage converter is a step up voltage converter.

* * * * *